United States Patent [19]

Oten

[11] Patent Number: 4,889,151
[45] Date of Patent: Dec. 26, 1989

[54] SNAP ACTION PRESSURE RELIEF VALVE WITH OVER PRESSURE INDICATOR

[76] Inventor: Peter D. Oten, 1731 Harrow Ct. No. B, Wheaton, Ill. 60187

[21] Appl. No.: 266,524

[22] Filed: Nov. 3, 1988

[51] Int. Cl.⁴ .................. F16K 17/14; F16K 37/00
[52] U.S. Cl. .................................. 137/71; 137/469; 137/551; 137/543.17
[58] Field of Search .......... 137/68.1, 71, 551, 543.17, 137/469

[56] References Cited

U.S. PATENT DOCUMENTS

| | | | |
|---|---|---|---|
| 2,226,732 | 12/1940 | McBride | 137/71 |
| 2,845,945 | 8/1958 | Mancusi, Jr. | 137/469 |
| 3,048,188 | 8/1962 | Hunter | 137/469 |
| 3,164,164 | 1/1965 | Pall et al. | 137/557 X |
| 3,462,994 | 8/1969 | Maust | 137/543.17 X |
| 3,583,479 | 6/1971 | Taylor et al. | 137/71 X |
| 3,590,839 | 7/1971 | Moore | 137/71 |
| 3,810,485 | 5/1974 | Gawlick et al. | 137/71 |
| 3,872,875 | 3/1975 | Raidl, Jr. | 137/71 |
| 4,049,017 | 9/1977 | Jones | 137/543.17 X |
| 4,082,104 | 4/1978 | Keeney | 137/71 |
| 4,498,493 | 2/1985 | Harris | 137/469 |
| 4,587,987 | 5/1986 | West | 137/71 X |

Primary Examiner—John Rivell
Attorney, Agent, or Firm—Donald J. Breh

[57] ABSTRACT

A snap-action permanently indicating pressure relief valve is disclosed. The valve includes a valve member defining a flow path having an area less than the area of an inlet wherein the inlet pressure initially acts over a portion of a pressure surface of the valve member equal to the inlet area and subsequently acts over the entire area of the pressure surface to suddenly increase the velocity of the valve member. The valve member smacks and permanently deforms a deformable over pressure indicating element to give permanent indication of an over pressure condition.

25 Claims, 1 Drawing Sheet

SNAP ACTION PRESSURE RELIEF VALVE WITH OVER PRESSURE INDICATOR

BACKGROUND OF THE INVENTION

This invention relates to a pressure relief valve. More particularly, the invention relates to a pressure relief valve of the type having a pressure responsive poppet-type valve member that opens at a predetermined pressure to relieve pressure of a working fluid in a device.

Pressure relief valves of this general type are well known and the art is replete with different designs for different applications. One application, and one for which the present invention is particularly suited, is for maintaining or limiting the maximum pressure of a compressible fluid, such as air, to a device operated by or otherwise requiring a supply of pressurized compressible fluid. Typical applications would include any device incorporating an air motor or air actuated mechanism such as for example, air tools including impact wrenches, grinders, nailers and staplers among others. Such devices can be destroyed or damaged when subjected to pressures exceeding design limits and it is typical to provide pressure relief valves of the general type to which the invention relates to limit the pressure of the fluid supplied to the device to a maximum permissible safe level.

Despite the inclusion of such pressure relief valves, it is possible with some tools to raise the supply pressure above the maximum permissible level to such an extent that the pressure delivered to the operating mechanism will also be raised above the permissible pressure level even though the relief valve has functioned in its intended manner to vent the excess pressure. While the device may operate at the elevated pressure, sustained operation at the elevated pressure can eventually damage the device. Accordingly, it would be advantageous, and desirable, particularly for a manufacturer or supplier of the device, to have a permanent indication as to whether the device has been subjected to unreasonably high pressures. Such permanent indication that the device was subjected to pressures outside of its design limits could be used for example as one criteria for evaluating the validity of warrantee claims in case of failure or damage to the device.

SUMMARY OF THE INVENTION

It is, accordingly, the object of the present invention to provide for a pressure relief valve that gives a permanent indication that it has functioned.

According to the invention there is provided a poppet-type valve member in a valve body which is biased to normally close the inlet to the valve and which is responsive to open the inlet at a predetermined inlet pressure to actuate means for giving a permanent indication that the valve member has functioned.

According to an important feature of the invention, the means providing for permanent indication of valve function is a permanently deformable element in the path of movement of the valve member which, at a fully open position of the valve member, is struck by the valve member and deformed.

According to the invention, the deformable element is observable from externally of the valve housing through the valve outlet.

Another feature of the invention provides for the deformable member to be a thin, flat bridge portion of a valve spring retainer, which bridge extends across the valve passage proximate the outlet.

A still further important feature of the invention provides for the valve member to be provided with a pointed projection on one face which contacts the deformable element.

According to an alternative construction, the projection is provided on the deformable member.

According to another aspect of the invention, the valve member is a fast acting, snap-action valve.

According to the invention the valve member is adapted to initially move at one velocity in response to a predetermined inlet pressure and then at a higher velocity to the fully open position where it strikes the indicating element.

According to the invention, means providing for the snap-action movement includes means for increasing the effective surface area of the valve member over which the inlet pressure acts after the initial valve movement.

An important feature of the invention provides for a fluid flow path across the valve member which has an area less than the inlet area which is closed by a portion of the pressure surface of the valve member. Accordingly, the inlet pressure initially acts on the portion of the valve member pressure surface which closes the inlet and subsequently acts over the entire area of the pressure surface of the valve member thereby, exerting an increased force on the valve member and a resultant increase in valve velocity.

According to one feature of the invention, the flow path across the valve is an annular clearance space between the valve member and the wall of the main through passage in the valve body.

BRIEF DESCRIPTION OF THE DRAWINGS

The invention will be better understood after reading the following Detailed Description of a Preferred Embodiment in conjunction with the Drawings in which:

FIG. 6 is a cross sectional view of a portion of the valve in FIG. 3 showing an alternative construction of the deformable element and valve member.

DETAILED DESCRIPTION OF A PREFERRED EMBODIMENT

Figure 1:
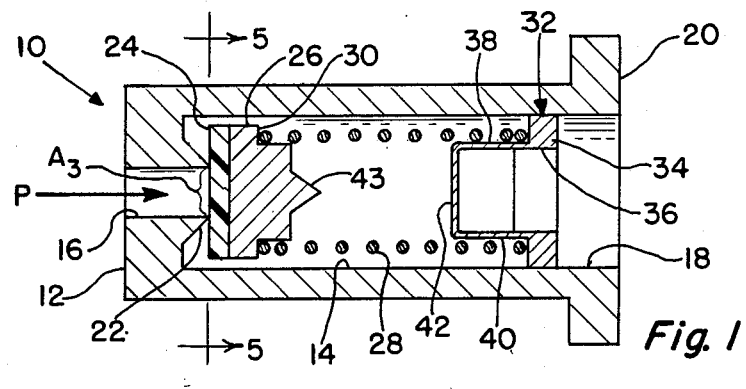
FIG. 1 is a vertical longitudinal cross sectional view of a preferred embodiment of a valve according to the invention in the normally closed position showing details of construction and operation.

Shown in FIG. 1 is a pressure relief valve 10 suitable for use with devices (not shown) such as air tools to limit the pressure of an inlet supply of operating fluid, such as air, to a desired maximum level. Preferably, the valve 10 is a poppet-type relief valve that opens an inlet at a predetermined pressure to vent the supply. It is to be understood that the pressure relief valve is adaptable to many different applications and is not limited to air tools or even compressible fluid supplies.

The valve 10 includes a valve body 12 having a central through passage 14, an inlet 16 and an outlet 18. The inlet opens to a supply of the fluid to be controlled and the outlet 18 opens, for example, to atmosphere. In the embodiment shown, the valve body 12 includes a flange 20 for mounting purposes but of course many different mountings are available.

The valve body is provided with a valve seat 22 around the inlet 16 which is sealedly contacted by a seal 24 provided on one end of a valve poppet 26. As shown in FIG. 1, the valve poppet is normally biased to close the inlet 16 by a compression spring 28 supported between the poppet, for example on the end or annular shoulder 30, and a spring retainer 32 mounted in the passage 14 proximate the outlet 18.

Figure 3:
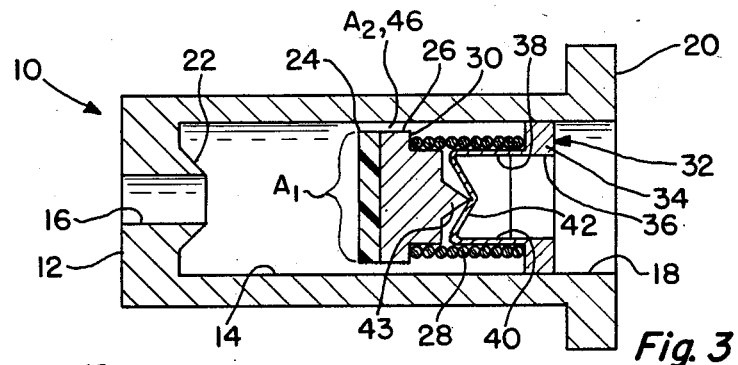
FIG. 3 is vertical longitudinal cross sectional view of the valve in FIG. 1 shown in the fully open position with the indicator element deformed.
Figure 4:
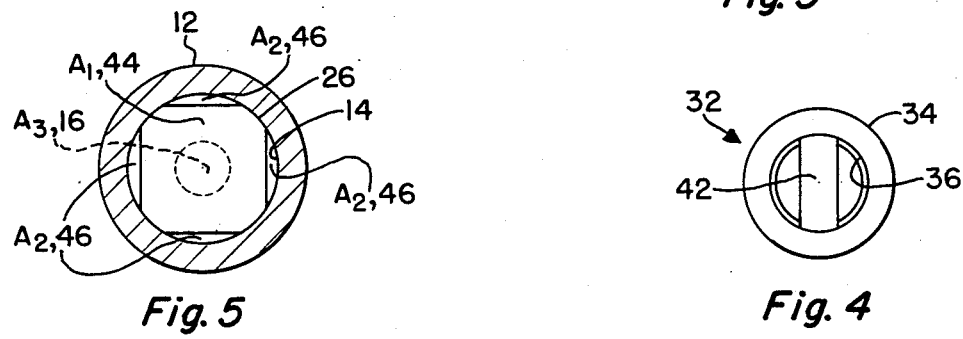
FIG. 4 is an end view of the spring retainer and indicator as viewed from the left in FIGS. 1 and 2 showing details of construction.

As shown in FIGS. 3 and 4, the spring retainer 32 is a washer shaped member 34 having a central hole 36 through which the vented fluid can pass to the outlet 18 and two parallel axial legs 38, 40 extending longitudinally into the spring interior. A thin permanently deformable bridge element 42 extends between the ends of the legs 38, 40 transversely relative to the passage 14 and is located approximately at or just before the fully open position of the valve member. Preferably, the deformable bridge element 42 is a thin, for example on the order of about 0.007 inch, flat element of easily deformed material such as brass. Other materials are, of course, also available.

The valve poppet 26 is provided with a central projection 43 in the form of a pointed, generally conical member which contacts and permanently deforms the indicator bridge element 42, as shown in FIG. 3. It can be seen that the indicator bridge element 42 is observable through the outlet 18 and that observation of its deformation will give indication that the valve has functioned. As disclosed below, the location of the indicator 42 in the passage, the rating of the spring 28 and sizing of the effective pressure surface areas of the poppet and inlet area are such that the projection 43 will contact the indicator under the influence of a predetermined maximum pressure in the inlet, thus giving a permanent indication that the device to be protected was subjected to a predetermined excessive pressure.

FIG. 6 shows an alternative construction of the valve poppet and indicator bridge wherein a projection 45 is provided on the bridge element 42 for contact by the face 47 of the valve poppet 26. Although the deformable element is preferably part of the spring retainer, it may be provided as a separate part in the passage if desired.

Figure 5:
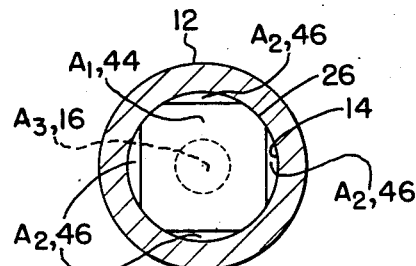
FIG. 5 is a cross sectional view taken along the line 5—5 in FIG. 1 showing details of construction of the valve member.

According to a very important feature of the invention, the poppet 26 has a snap-action movement which provides for quick opening and thus fast pressure relief as well as increased momentum of the valve when contacting the indicator element. The poppet 26 includes a pressure surface 44 having an area $A_1$ and, in the embodiment shown, is received in the passage 14 with an annular clearance forming a flow path 46 past the poppet. As shown in FIG. 5, the poppet 26 is generally square forming a nearly continuous annular clearance space between the periphery of the poppet and the cylindrical wall of the passage 14. The total area of the flow path 46 is designated as $A_2$. The area $A_2$ of the flow path 46 is sized to provide a desired flow past the valve at a predetermined inlet pressure and the area of the inlet $A_3$, shown in dashed outline in FIG. 5, is then sized to be greater than the flow path area $A_2$ and sufficient to initiate movement of the valve at the predetermined maximum pressure P. It can be seen that, with the inlet closed by the poppet, as shown in FIG. 1, the inlet pressure P acts over a portion of the pressure surface 44 equal to the area of the inlet $A_3$ and that, at a predetermined inlet pressure, the poppet will move, to the right as viewed in the drawings, at a first velocity dependent on the area $A_3$ to an intermediate position shown in FIG. 2. Pressure fluid will begin to flow from the inlet 16 through the flow path 46 and out the outlet 18.

Figure 2:
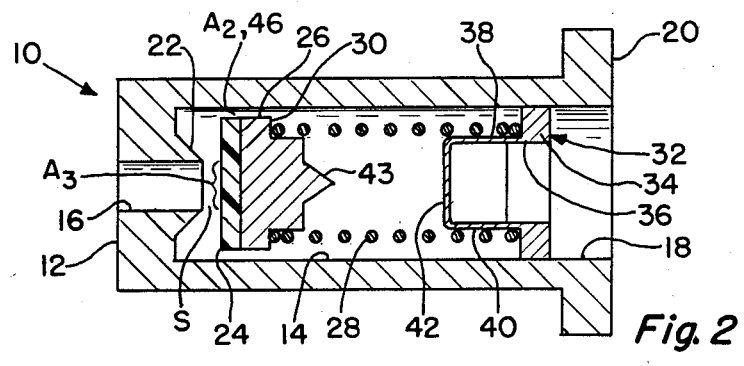
FIG. 2 is a vertical longitudinal cross sectional view of the valve in FIG. 1 shown in an intermediate open position.

At the intermediate position of FIG. 2, the area of the annular space S between the poppet and the valve seat 22 has increased to the point where the pressure fluid now acts over the entire area $A_1$ of the pressure surface 44. Accordingly, the force on the poppet suddenly increases causing a sudden increase in the velocity of the poppet. It has been found that, so long as the area $A_2$ of the flow path 46 is maintained less than the area $A_3$ of the inlet, the effective area of the pressure surface 44 acted on by the inlet pressure will change-over from the smaller area $A_3$ of the inlet to the larger entire area $A_1$ of the pressure surface 44. By appropriately changing the spring rate, the inlet area $A_3$, the flow path area $A_2$ and the pressure surface area $A_1$, but keeping the inlet area $A_3$ greater than the flow path area $A_2$, the amount of valve movement required before the change-over in valve velocity occurs can be controlled. That is, for a given spring rate and pressure surface area $A_1$, as the area $A_2$ approaches the area $A_3$ in size, the intermediate position of the valve will be shifted farther to the right, as viewed in FIG. 2, and accordingly the point at which the valve snap-action opening takes place will be delayed. Conversely, as the area $A_2$ is made smaller relative to the inlet area $A_3$, the intermediate position, and thus the snap-action point of the valve, will occur sooner in the valve movement. As noted, at the change-over point, the valve suddenly accelerates to the fully open position, smacks and permanently deforms the indicator 42. The area $A_1$ determines the force on the valve member and thus the increase in valve velocity and momentum when it strikes the indicator. It should be noted that, in the embodiment disclosed, the flow path 46 is a nearly continuous annular clearance space around the periphery of the valve however, other flow paths can be provided for. For example, the poppet 26 could be provided with one or more holes through the pressure surface 44 with the poppet periphery sealed to the passage wall 14 provided that the total area of all of the holes so provided is maintained less than the area of the inlet.

Having described the preferred embodiment of the invention, those skilled in the art having the benefit of the description can readily desire other embodiments and modifications and such other embodiments and modifications are to be considered to be within the scope of the appended claims.

What is claimed is:

1. A pressure relief valve, comprising:
    a valve body including an internal passage between an inlet and an outlet;
    a valve member in said passage biased to normally close said inlet and adapted to open said inlet at a predetermined pressure in said inlet; and,
    means associated with said valve member for permanently indicating that said valve member has opened said inlet including a permanently deformable element in said passage, said valve member adapted to contact and permanently deform said deformable element.

2. The pressure relief valve as defined in claim 1 wherein said deformable element is a thin deformable bridge-like member extending at least partially across said passage.

3. The pressure relief valve as defined in claim 2 wherein said valve member includes a central projection adapted to contact said bridge-like member.

4. The pressure relief valve as defined in claim 2 wherein said bridge-like member includes a central projection adapted to be contacted by said valve member.

5. The pressure relief valve as defined in claim 1 wherein said deformable element is a thin deformable bridge-like portion of a spring retainer, said spring retainer disposed in said passage with said deformable bridge-like portion extending at least partially across said passage.

6. The pressure relief valve as defined in claim 5 wherein said valve member includes a central projection adapted to contact said bridge-like portion of said spring retainer.

7. The pressure relief valve as defined in claim 6 wherein said valve member is a poppet carrying a seal on one face for closing said inlet and said projection on an opposite face.

8. The pressure relief valve as defined in claim 5 wherein said thin deformable bridge-like portion includes a central projection adapted to be contacted by said valve member.

9. The pressure relief valve is defined in claim 1 further including means providing for snap-action movement of said valve member during opening of said inlet.

10. The pressure relief valve as defined in claim 9 wherein said means providing for snap-action movement includes a flow passage across said valve member wherein said flow passage has an area less than an area of the inlet and said valve member includes a pressure surface a portion of which is sealedly disposed over said inlet to close said inlet.

11. The pressure relief valve as defined in claim 10 wherein said valve member is a poppet in said passage, one face of said poppet defining said pressure surface.

12. The pressure relief valve as defined in claim 11 wherein said flow path is defined by a clearance space between said poppet and a surface defining said internal passage.

13. A pressure relief valve comprising:
a valve body including an internal through passage between an inlet and an outlet;
a valve member in said through passage defining a flow path across said valve member between said inlet and said outlet, said inlet having an area greater than an area of said flow path, said valve member including a pressure surface having an area greater than the area of said inlet;
means for biasing said valve member to close said inlet with a portion of said pressure surface over said inlet, said means for biasing said valve member and the magnitude of the area of said inlet adapted to provide for movement of said valve member to open said inlet at a predetermined pressure in said inlet, whereby said valve member moves to an intermediate position at a first velocity under the influence of said inlet pressure acting on said portion of said pressure surface, and moves from said intermediate position to a fully open position at a second velocity greater than said first velocity under the influence of aid inlet pressure acting over the entire area of the pressure surface; and
means for permanently indicating that said valve member has moved to the fully open position including a deformable element positioned in said through passage for contact by said valve member.

14. The pressure relief valve as claimed in claim 13 wherein said valve member includes a projection on a side opposite said pressure surface, said projection adapted to contact said deformable element.

15. The pressure relief valve as defined in claim 13 wherein said deformable element includes a projection adapted to be contacted by said valve member.

16. The pressure relief valve as defined in claim 13 wherein said valve member is a disc-like poppet and said flow path is an annular clearance space between said poppet and a wall defining said internal through passage.

17. The pressure relief valve as defined in claim 16 wherein said deformable element is disposed in said through passage at a position observable from externally of the valve body through the outlet and for contact by said poppet in the fully open position.

18. The pressure relief valve as defined in claim 17 wherein said deformable element is a bridge-like member extending at least partially across said through passage.

19. The pressure relief valve as defined in claim 18 wherein said bridge-like member includes a projection adapted to be contacted by said poppet.

20. The pressure relief valve as defined in claim 18 wherein said poppet includes a projection adapted to contact said bridge-like member.

21. The pressure relief valve as defined in claim 17 wherein said deformable element is part of a spring retainer and said means for biasing said valve member is a compression spring supported between said spring retainer and said poppet, said deformable element disposed internally of said compression spring at one end of said spring and said poppet includes a projection protruding internally of said spring at an opposite end of said spring 22. The pressure relief valve as defined in claim 17 wherein said deformable element is part of a spring retainer and said means for biasing said valve member is a compression spring supported between said spring retainer and said poppet, said deformable element including a projection disposed internally of said compression spring at one end of said spring, said projection adapted to be contacted by said poppet.

23. The pressure relief valve as defined in claim 21 wherein said poppet includes a seal on said pressure surface sealingly engaging said valve body around said inlet.

24. A pressure relief valve comprising:
a valve body having an internal through passage between an inlet and an outlet;
valve means in said internal through passage normally biased to a closed position responsive to a predetermined inlet pressure in said inlet to move to an open position connecting said inlet to said outlet, said valve means including a pressure surface, a portion of said pressure surface acted on by said inlet pressure with said valve means in said closed position;
means providing for said predetermined inlet pressure to act over the entire pressure surface of said valve means after an initial movement of said valve means from the closed position under the influence of said predetermined pressure having acted on said portion of said pressure surface; and means for indicating that said valve has moved to said open position including a deformable element in said through passage contacted by said valve means in the open position.

25. The pressure relief valve as defined in claim 24 wherein said valve means defines a flow path connecting said inlet and said outlet, said flow path having an area less than the area of said inlet and the area of said pressure surface is greater than the area of said inlet.

* * * * *